United States Patent
Hayashi (10) Patent No.: US 9,753,337 B2
(45) Date of Patent: Sep. 5, 2017

(54) DISPLAY DEVICE AND REFLECTIVE LIQUID CRYSTAL DISPLAY DEVICE COMPRISING FIRST TO FOURTH PIXELS RESPECTIVELY CONNECTED TO FIRST TO FOURTH SIGNAL LINES

(71) Applicant: Japan Display Inc., Minato-ku (JP)

(72) Inventor: Hirotaka Hayashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 177 days.

(21) Appl. No.: 14/607,543

(22) Filed: Jan. 28, 2015

(65) Prior Publication Data
US 2015/0212376 A1 Jul. 30, 2015

(30) Foreign Application Priority Data

Jan. 29, 2014 (JP) ................................ 2014-014338

(51) Int. Cl.
*G02F 1/1343* (2006.01)
(52) U.S. Cl.
CPC .... *G02F 1/134336* (2013.01); *G02F 2201/52* (2013.01)
(58) Field of Classification Search
CPC .......... G02F 1/134336; G02F 2201/52; G02F 1/134309
See application file for complete search history.

(56) References Cited

U.S. PATENT DOCUMENTS

| | | | |
|---|---|---|---|
| 2010/0013803 A1 | 1/2010 | Noguchi et al. | |
| 2010/0283714 A1* | 11/2010 | Cho | G09G 3/3607 345/90 |
| 2012/0194573 A1* | 8/2012 | Yamashita | G09G 3/3614 345/690 |
| 2012/0200615 A1* | 8/2012 | Tsubata | G09G 3/3614 345/690 |
| 2012/0268707 A1* | 10/2012 | Yamashita | G09G 3/3607 349/143 |

(Continued)

FOREIGN PATENT DOCUMENTS

| | | |
|---|---|---|
| JP | 2010-26245 | 2/2010 |
| WO | WO 2011/089838 A1 | 7/2011 |
| WO | WO 2011/093387 A1 | 8/2011 |

OTHER PUBLICATIONS

Japanese Office Action dated Jul. 4, 2017, issued in Japanese Patent Application No. 2014-014338 (with English translation).

*Primary Examiner* — Paul Lee
(74) *Attorney, Agent, or Firm* — Oblon, McClelland, Maier & Neustadt, L.L.P.

(57) ABSTRACT

According to one embodiment, a display device includes a unit pixel includes a first pixel including a first pixel electrode, a second pixel including a second pixel electrode, a third pixel including a third pixel electrode, and a fourth pixel including a fourth pixel electrode, a scanning line electrically connected to the first to fourth pixels, and first to fourth signal lines extending in the column direction and disposed at intervals in the row direction, the first to fourth signal lines electrically connected to the first to fourth pixels, respectively, wherein the first to fourth pixel electrodes are light reflective, and the scanning line is sequentially drawn into each pixel area of the first to fourth pixels in a manner that an entire width of the scanning line is contained within each pixel area.

16 Claims, 10 Drawing Sheets

(56) References Cited

U.S. PATENT DOCUMENTS

2012/0299947 A1 11/2012 Tsuda et al.
2013/0002992 A1* 1/2013 Hirata .................. G02F 1/1362
                                                           349/85
2015/0109267 A1 4/2015 Aoki et al.

* cited by examiner

F I G. 12

DISPLAY DEVICE AND REFLECTIVE LIQUID CRYSTAL DISPLAY DEVICE COMPRISING FIRST TO FOURTH PIXELS RESPECTIVELY CONNECTED TO FIRST TO FOURTH SIGNAL LINES

CROSS-REFERENCE TO RELATED APPLICATIONS

This application is based upon and claims the benefit of priority from Japanese Patent Application No. 2014-014338, filed Jan. 29, 2014, the entire contents of which are incorporated herein by reference.

FIELD

Embodiments described herein relate generally to a display device and a reflective liquid crystal display device.

BACKGROUND

Liquid crystal display devices are commercially well-known. Furthermore, in recent years, mobile devices are used in increasingly wide purposes. As such mobile devices, smartphones with liquid crystal display devices are well-known, for example. As to such liquid crystal display devices, improvement of display quality is in great demand to achieve higher definition, higher color purity, and higher brightness of the display. Furthermore, lower energy consumption is also in great demand to achieve a longer battery drive.

In order to satisfy the above contradictory demands for achieving the higher color purity, higher brightness, and lower power consumption at the same time, research and development of liquid crystal display devices using a pixel structure of four color subpixels: red, green, blue, and white (RGBW) are keen to substitute an ordinary pixel structure of three color subpixels: red, green, and blue (RGB).

However, when using a so-called RGBW stripe pixel structure (in which columns of four subpixels of RGBW extending linearly are arranged in a row direction), each pixel has a slender shape which causes a significant decrease in display uniformity. To solve such a problem of the decrease in display quality, a so-called RGBW square pixel structure (in which four subpixels of RGBW are arranged in a square) is under development.

Here, comparing the RGBW square pixel structure to the RGBW stripe pixel structure, the number of subpixels arranged in each column of the RGBW square pixel structure is twice that of the RGBW stripe pixel structure. That is, the number of scanning lines of the RGBW square pixel structure is twice as much, too. What should be noted here is a writing time. The writing time of image signals from signal lines to subpixels varies depending on the number of scanning lines, and the time must be shortened if the number of scanning lines increases. The resolution in the horizontal direction can be improved by simply increasing the number of signal lines and it has no effect on the writing time. However, when higher definition of display performance and greater frame frequency are aimed, reduction of the writing time of image signals is inevitable. As a result, a writing time of image signals will become insufficient and energy consumption in a driving circuit will increase significantly due to the increase of driving frequency.

In consideration of the above, there is a technique under development which provides one scanning line per row of RGBW square pixels while providing two signal lines per column of RGBW square pixels. That is, four subpixels of an RGBW square pixel share a single scanning line. With this technique, even when the RGBW square pixel structure is used and the driving frequency is increased, a sufficient writing time of image signals can be secured. Furthermore, the energy consumption in a driving circuit can be suppressed (that is, lower power consumption can be achieved).

Incidentally, if reflection-type liquid crystal display devices are manufactured using pixels each including a plurality of subpixels (for example, RGBW square pixels), the arrangement of the scanning line to be shared with the subpixels is important.

In conventional reflection-type liquid crystal display devices, the scanning line in each square pixel unit has been laid under reflecting electrodes of either upper two subpixels or lower two subpixels in such a manner that the scanning line and the reflecting electrodes overlap. However, in this structure, the scanning line and the reflecting electrodes generate a coupling capacitance at the upper two subpixels and a coupling capacitance at the lower two subpixels those are different from each other and this causes display quality deterioration. As a possible approach to solve this problem, the scanning line may be formed at a gap in a boundary between the upper subpixels and the lower subpixels. However, in this approach, the line which does not contribute to the display itself is largely exposed from a gap between reflecting electrodes and will still cause the display quality deterioration.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments will be described hereinafter with reference to the accompanying drawings.

In general, according to one embodiment, a display device includes: a unit pixel comprising a first pixel including a first pixel electrode, a second pixel adjacent to the first pixel in a column direction and including a second pixel electrode, a third pixel adjacent to the first pixel in a row direction and including a third pixel electrode, and a fourth pixel adjacent to the second pixel in the row direction and adjacent to the third pixel in the column direction and including a fourth pixel electrode; a scanning line electrically connected to the first to fourth pixels; and first to fourth signal lines extending in the column direction and disposed at intervals in the row direction, the first to fourth signal lines electrically connected to the first to fourth pixels, respectively, wherein the first to fourth pixel electrodes are light reflective, and the scanning line is sequentially drawn into each pixel area of the first to fourth pixels in a manner that an entire width of the scanning line is contained within each pixel area.

Hereinafter, embodiments of the present application will be explained with reference to accompanying drawings.

Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the Figures as compared to actual embodiments for the sake of simpler explanation, and they are not to limit the interpretation of the invention of the present application. Furthermore, in the description and Figures of the present application, structural elements having the same or similar functions will be referred to by the same reference numbers and detailed explanations of them that are considered redundant may be omitted.

[First Embodiment]

Figure 1:
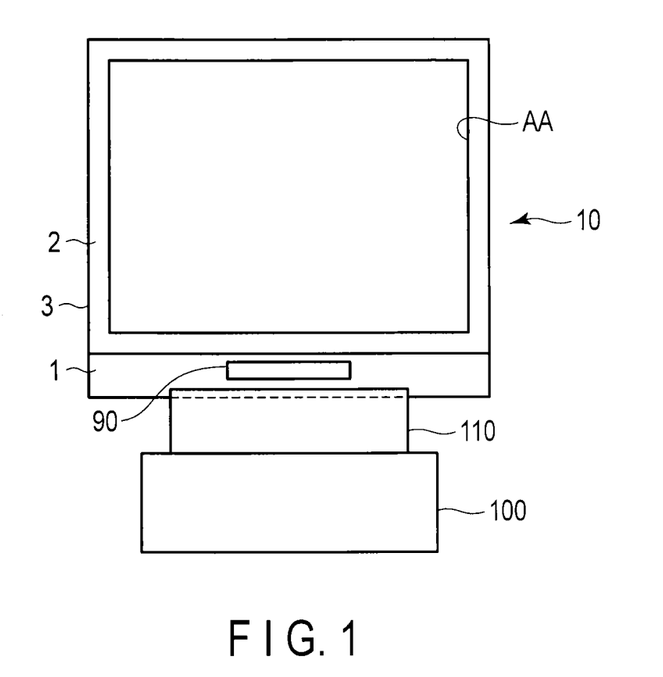
FIG. 1 is a plan view which schematically shows a reflection-type liquid crystal display device of first embodiment.

FIG. 1 is a plan view which schematically shows a reflection-type liquid crystal display device of first embodiment.

The liquid crystal display device includes a liquid crystal display panel 10, signal line driving circuit 90, control unit 100, and flexible printed circuit (FPC) 110.

The liquid crystal display panel 10 includes an array substrate 1, counter-substrate 2 opposed to the array substrate 1 with a certain gap therebetween, and liquid crystal layer 3 which is held between these substrates. The signal line driving circuit 90 functions as an image signal output unit. The control unit 100 controls whole functions of the liquid crystal display device. FPC 110 is a communication path to send/receive signals used to drive the liquid crystal display panel 10. Furthermore, in a display area AA of the liquid crystal display panel 10, pixels PX described later are arranged in a matrix.

Figure 2:
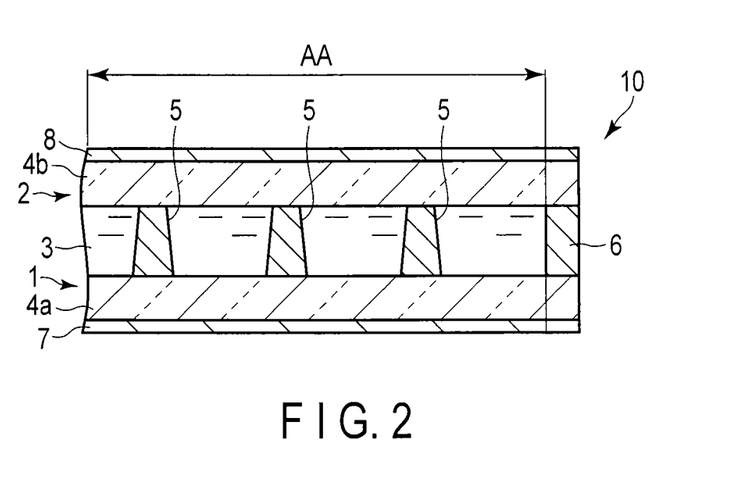
FIG. 2 is a cross-sectional view which schematically shows the reflection-type liquid crystal display device of the first embodiment.

FIG. 2 is a cross-sectional view which schematically shows the reflection-type liquid crystal display device of the first embodiment.

As mentioned above, the liquid crystal display panel 10 includes the array substrate 1, counter-substrate 2, and liquid crystal layer 3 held between these substrates.

The array substrate 1 includes, for example, a glass substrate 4a as a transparent insulating substrate. On a surface of the glass substrate 4a which is opposed to the liquid crystal layer 3, a pixel electrode (reflecting electrode), and a pixel circuit composed of a scanning line, signal line, switching element (those are described later), and the like are layered. First optical part 7 is provided with an external surface of the array substrate 1 (the opposite surface to the surface facing the liquid crystal layer 3). The first optical part 7 is, for example, a polarizer.

The counter-substrate 2 includes, for example, a glass substrate 4b as a transparent insulating substrate. Although this is not depicted, a color filter, counter-electrode (common electrode), and alignment film are formed successively upon the glass substrate 4b to form the counter-substrate 2. Second optical part 8 is provided with an external surface of the counter-substrate 2 (the opposite surface to the surface facing the liquid crystal layer 3). The second optical part 8 is, for example, a polarizer. The external surface of the second optical part 8 is a display surface.

The gap between the array substrate 1 and the counter-substrate 2 is held by, for example, columnar spacers 5. The array substrate 1 and the counter-substrate 2 are attached by a sealing member 6 disposed at the periphery of these substrates.

Figure 3:
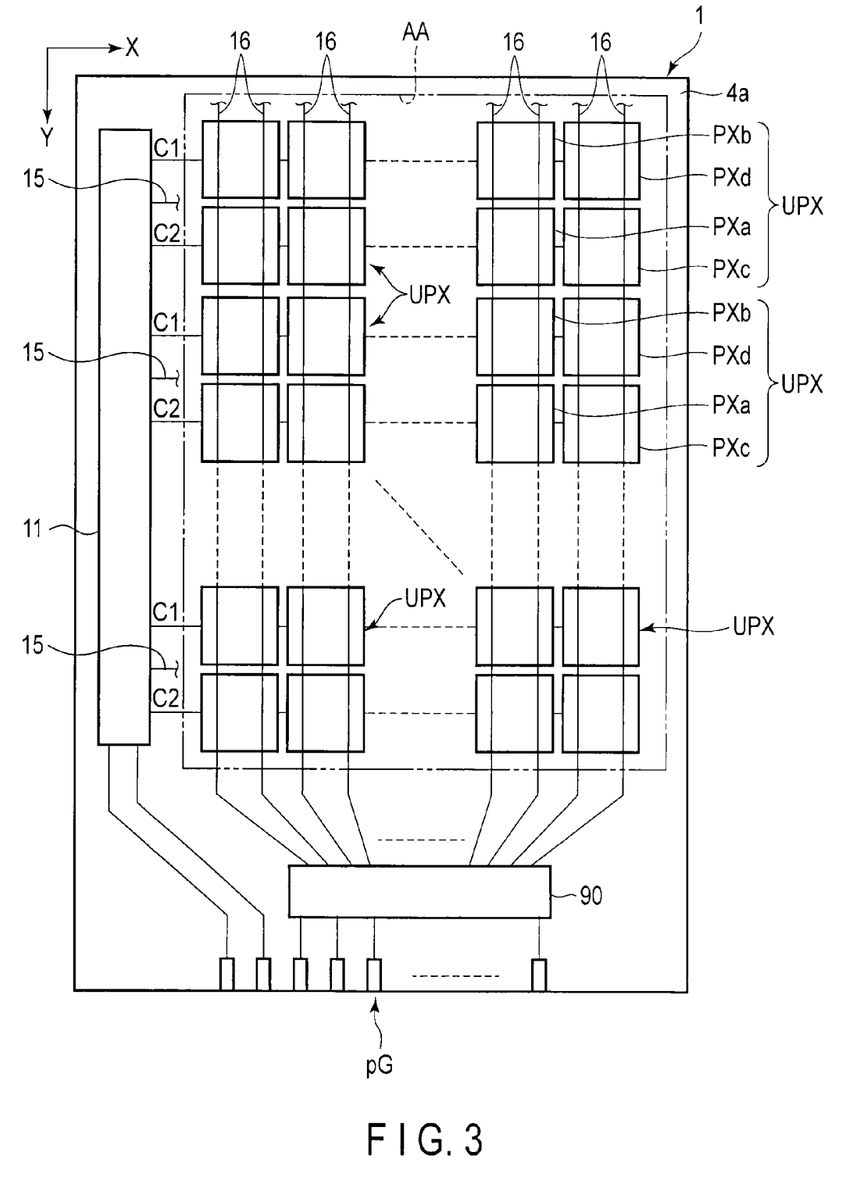
FIG. 3 is a plan view which schematically shows an array substrate of the reflection-type liquid crystal display device of the first embodiment.

FIG. 3 is a plan view which schematically shows the array substrate of the reflection-type liquid crystal display device of the first embodiment.

In the display area AA, a plurality of unit pixels UPX arranged in a matrix on the glass substrate 4a. The unit pixels UPX are arranged in a matrix of m×n where m is the number of unit pixels in row direction X and n is the number of unit pixels in column direction Y which is perpendicular to the row direction X. Here, the unit pixel UPX is an RGBW square pixel.

Each unit pixel UPX includes a plurality of pixels PX. In this embodiment, each unit pixel UPX includes first pixel PXa, second pixel PXb, third pixel PXc, and fourth pixel PXd. Second pixel PXb is adjacent to first pixel PXa in the column direction Y. Third pixel PXc is adjacent to first pixel PXa in the row direction X. Fourth pixel PXd is adjacent to second pixel PXb in the row direction X and to third pixel PXc in the column direction Y.

Here, referring to pixels PX instead of the unit pixels UPX, the pixels PX are arranged in a matrix of 2m×2n where 2m is the number of pixels in the row direction X and 2n is the number of pixels in the column direction Y. In the odd-number rows, the second pixels PXb and the fourth pixels PXd are arranged alternately. In the even-number rows, the first pixels PXa and the third pixels PXc are arranged alternately. In the odd-number columns, the second pixel PXb and the first pixel PXa are arranged alternately. In the even-number columns, the fourth pixels PXd and the third pixels PXc are arranged alternately.

Note that the unit pixel UPX may be interpreted as a picture element. Furthermore, the unit pixel UPX may be interpreted as a pixel, and in that case, the pixel PX may be interpreted as a subpixel.

Outside the display area AA, a scanning line driving circuit 11 and a pad group pG of outer lead bonding are formed on the glass substrate 4a.

In the display area AA, a plurality (n) of scanning lines 15, a plurality (2n) of auxiliary capacitance lines C (C1 and C2), and a plurality (4m) of signal lines 16. The signal lines 16 extend in the column direction Y and disposed at intervals in the row direction X. The scanning lines 15 extend in the row direction X and are electrically connected to the first pixel PXa to fourth pixel PXd. First pixels PXa to fourth pixels PXd of the unit pixels UPX aligned in the row direction X are electrically connected to a single scanning line 15. Note that how the first pixels PXa to fourth pixels PXd of the unit pixels UPX are connected to the scanning line 15 is explained later.

Auxiliary capacitance lines C extend in the row direction X and are electrically connected to first pixels PXa to fourth pixels PXd. Second pixels PXb and fourth pixels PXd of the unit pixels UPX aligned in the row direction X are electrically connected to a single auxiliary capacitance line C1. First pixels PXa and third pixels PXc of the unit pixels UPX aligned in the row direction X are electrically connected to a single capacitance line C2. Note that auxiliary capacitance lines C1 and C2 are not necessarily separated from each other and may be formed as branches of a single auxiliary capacitance line C. Note that how the first pixels PXa to fourth pixels PXd of the unit pixels UPX are connected to the auxiliary capacitance lines C is explained later.

Figure 4:
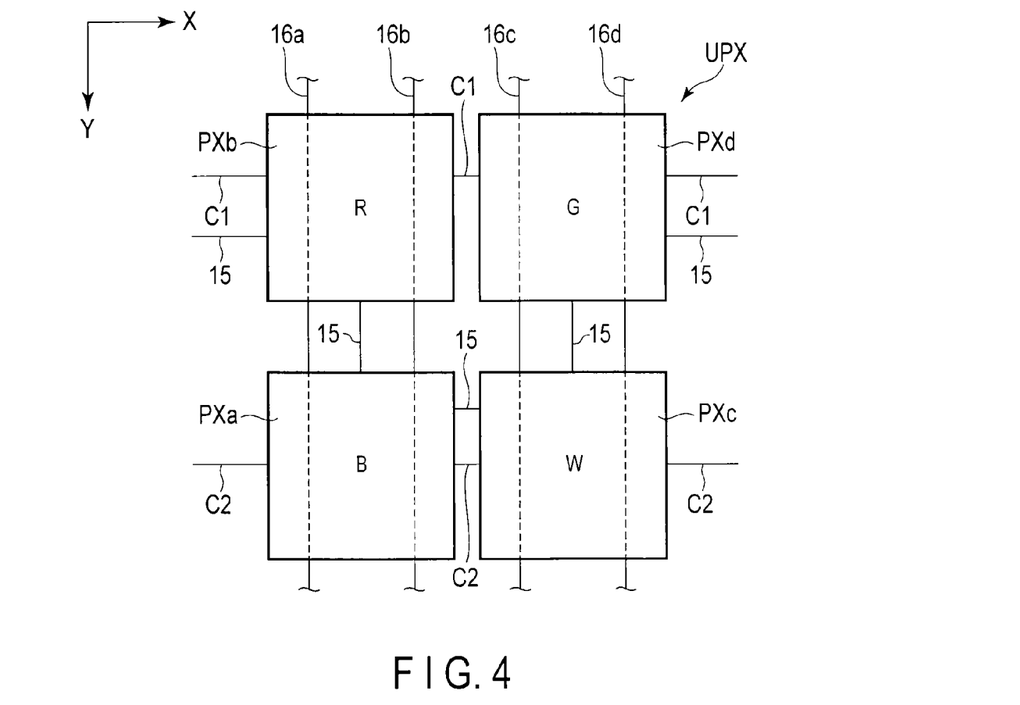
FIG. 4 is a view which specifically illustrates one of unit pixels on the array substrate of the reflection-type liquid crystal display device of the first embodiment.

FIG. 4 is a view which specifically illustrates one of the unit pixels UPX on the array substrate of the reflection-type liquid crystal display device of the first embodiment.

First pixel PXa to fourth pixel PXd are configured to display different colors. In the present embodiment, first pixel PXa to fourth pixel PXd display the colors of green (G), blue (B), white (achromatic color, W), and red (R), respectively.

Among the signal lines 16, four signal lines of first signal line 16a to fourth signal line 16d extend in the column direction Y to connect first pixel PXa to fourth pixel PXd. Among the auxiliary capacitance lines C, auxiliary capacitance line C1 corresponds to the upper row pixels (second pixels PXb and fourth pixels PXd) of the unit pixels UPX aligned in the row direction X and auxiliary capacitance line C2 corresponds to the lower row pixels (first pixels PXa and third pixels PXc) of the unit pixels UPX aligned in the row direction X. The scanning line 15 extends in the row direction X and is connected to first pixel PXa to fourth pixel PXd changing its path within the unit pixel UPX.

Figure 5:
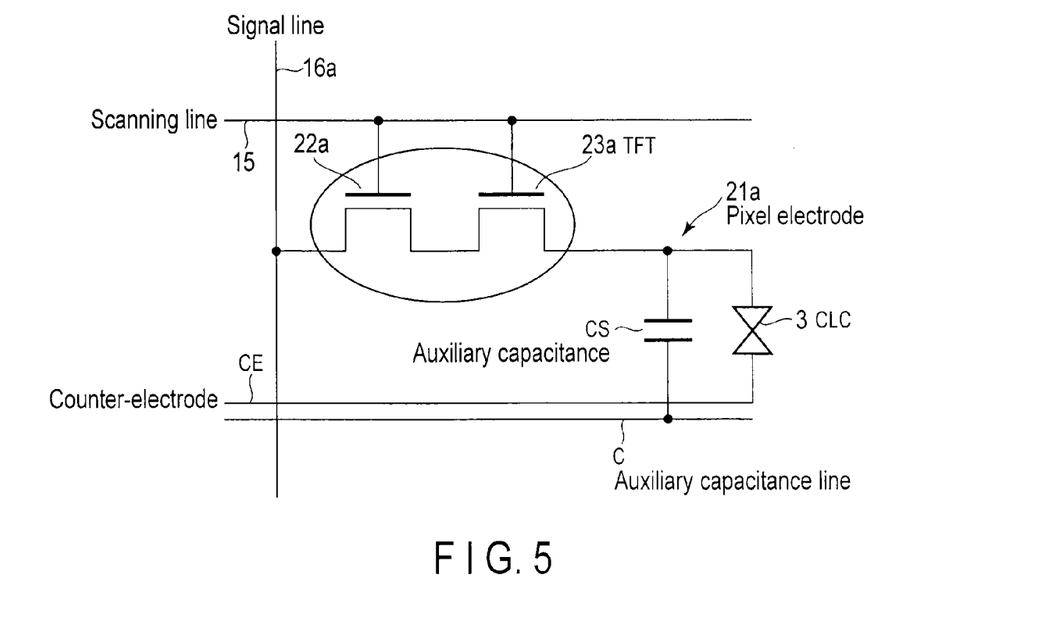
FIG. 5 is a view which shows an equivalent pixel circuit of the reflection-type liquid crystal display device of the first embodiment.

FIG. 5 is a view which shows an equivalent pixel circuit of the reflection-type liquid crystal display device of the first embodiment. The pixel circuit structure is common to the pixels (PXa to PXd) in each unit pixel UPX. Thus, the first pixel PXa is exemplified here.

In the proximity of the crossing point of the scanning line 15 and signal line 16a, two switching elements 22a and 23a are provided. Each of the switching elements 22a and 23a is formed of a thin-film transistor (TFT) whose gate is connected to the scanning line 15 and whose source-drain path is connected between signal line 16a and pixel electrode 21a, and conducts between signal line 16a and pixel electrode 21a when it is driven via the scanning line 15. Each of the switching elements 22a and 23a is formed of, for example, a polysilicon thin-film transistor.

Pixel electrode 21a is formed of a reflective nontransparent electrode material (for example, a metal), counter-electrode CE is formed of a transparent electrode material such as indium tin oxide (ITO), and they are covered with an alignment film, respectively. Liquid crystal 3 is controlled by the field from pixel electrode 21a and counter-electrode CE such that the liquid crystal molecules therein are aligned corresponding to the applied field. A liquid crystal capacitance CLC is formed between pixel electrode 21a and the counter-electrode CE. The auxiliary capacitance line C structures an auxiliary capacitance Cs which has capacitive coupling with pixel electrode 21a. The auxiliary capacitance Cs has a sufficiently large capacitance with respect to a parasitic capacitance of the switching elements 22a and 23a.

Note that the TFT shown in FIG. 5 is a double-gate type; however, no limitation is intended thereby, and the TFT may be formed as a single-gate type, or a triple-gate type, or the like.

Figure 6:
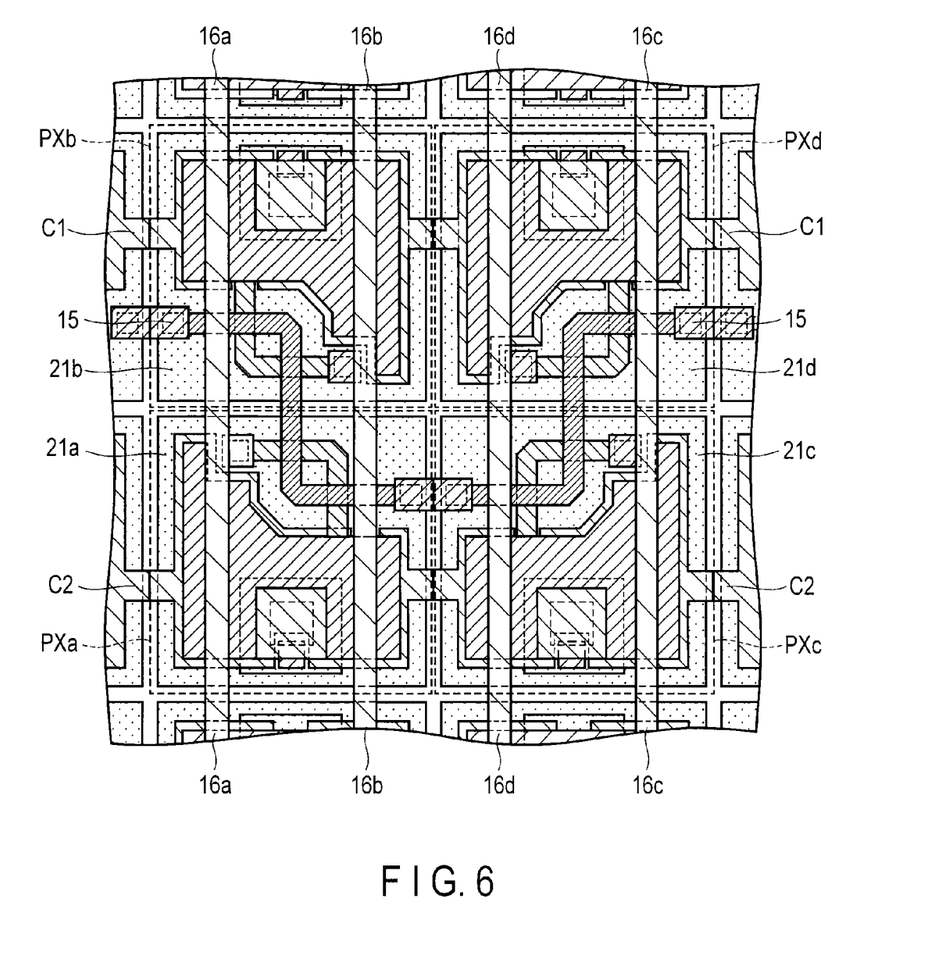
FIG. 6 is a view which shows a layout pattern of a square pixel structure on the array substrate of the reflection-type liquid crystal display device of the first embodiment.

FIG. 6 is a view which shows a layout pattern of a square pixel structure on the array substrate of the reflection-type liquid crystal display device of the first embodiment.

In FIG. 6, there are four areas surrounded by dotted lines, and each of these areas indicates a single pixel area. That is, a single pixel area (pixel area) is an area corresponding to pixel electrode 21a (or 21b, or 21c, or 21d).

Note that, in the layout pattern described below, a first signal line 16a is connected to the first pixel PXa, a second signal line 16b is connected to the second pixel PXb, a third signal line 16c is connected to the third pixel PXc, and a fourth signal line 16d is connected to the fourth pixel PXd. Thus, the arrangement order of the four signal lines of the first signal line 16a to fourth signal line 16d does not correspond to their ordinal numbers and is changed suitably.

The scanning line 15 supplied from the left side of FIG. 6 is drawn into the second pixel PXb. The scanning line 15 is connected to the gate of TFT at two points in the second pixel PXb, and then is drawn into the first pixel PXa. The scanning line 15 is connected to the gate of TFT at two points in the first pixel PXa, and then is drawn into the third pixel PXc. The scanning line 15 is connected to the gate of TFT at two points in the third pixel PXc, and then is drawn into the fourth pixel PXd. The scanning line 15 is connected to the gate of TFT at two points in the fourth pixel PXd, and then is drawn to the adjacent square pixel at the right side (which is not shown).

In the layout pattern on the array substrate of the reflection-type liquid crystal display device of the first embodiment, the scanning line 15 is arranged to run through the whole pixel areas in each square pixel sequentially in such a manner that its entire width can be contained in each pixel area. In more specific words, the scanning line 15 takes a rectangular wave shape within the square pixel, the shape formed by an interconnection drawn along the row direction X and the column direction Y.

Note that the auxiliary capacitance line C and the scanning line 15 are arranged in the same layer. Thus, the scanning line 15 arranged within the pixel areas must be avoided from contacting the auxiliary capacitance line C. In consideration of this point, the shape of the auxiliary capacitance line C within the pixel area is changed, and the shape of TFT is changed corresponding to this shape change of the auxiliary capacitance line C. Furthermore, in order to avoid the scanning line whose entire width is contained within each pixel area from deteriorating color display performance, the shape of the auxiliary capacitance line C within each pixel area should preferably be determined in such a manner that the first pixel PXa to fourth pixel PXd have substantially the same auxiliary capacitance Cs.

Note that the above shape of the scanning line 15 within the square pixel may be changed to be symmetrical with respect to a boundary line between the first pixel PXa and the second pixel PXb.

Now, advantages of the reflection-type liquid crystal display device of the first embodiment are explained.

Figure 7:
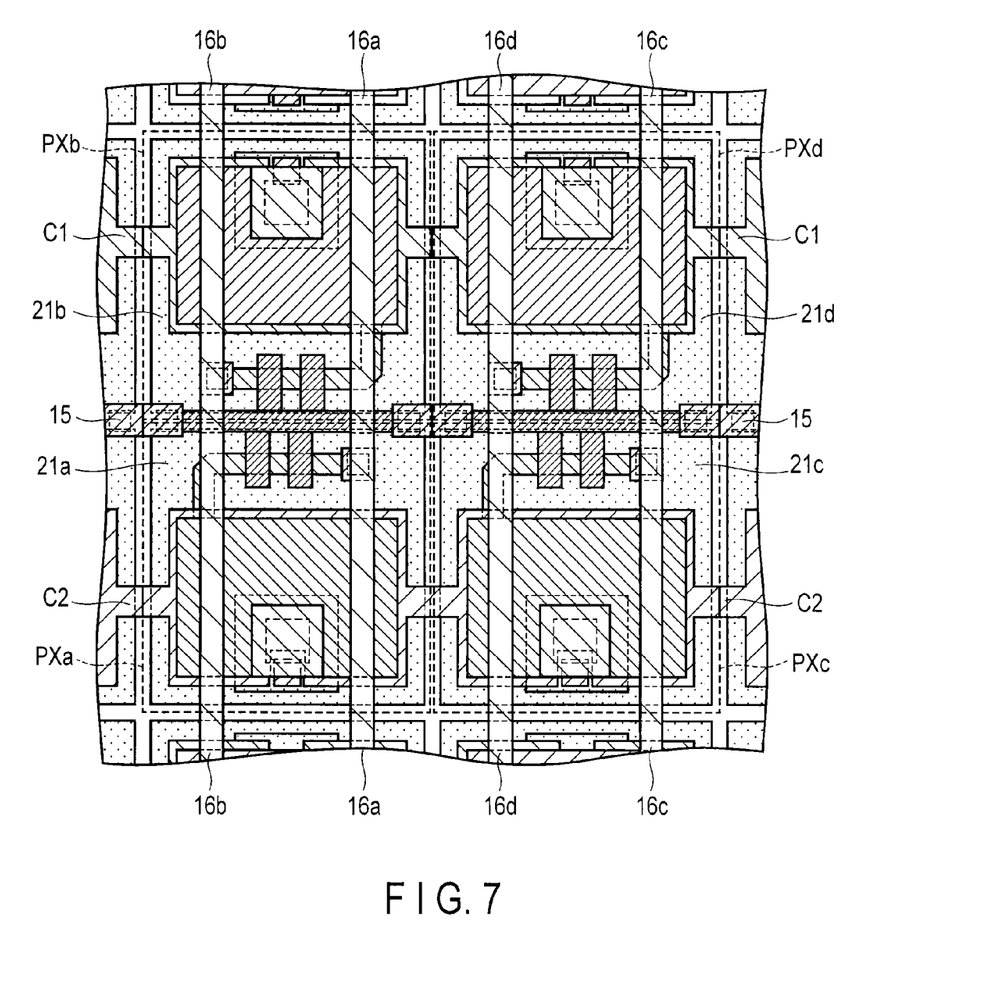
FIG. 7 is a view which shows a layout pattern of a square pixel structure on an array substrate of a conventional reflection-type liquid crystal display device.

FIG. 7 is a view which shows a layout pattern of a square pixel structure on an array substrate of a conventional reflection-type liquid crystal display device.

In the layout pattern on the array substrate of the conventional reflection-type liquid crystal display device, a scanning line 15 is drawn in the row direction along (or covering) a gap between upper two pixel areas and lower two pixel areas those are adjacent in the column direction within the square pixel. In the layout shown in FIG. 7, the auxiliary capacitance line C and the scanning line 15 do not contact each other without changing the shape of the auxiliary capacitance line C, and that is, the shape of each auxiliary capacitance line C is a rectangle.

Note that, other than the above point, the layout is similar to that of the first embodiment shown in FIG. 6. Thus, the other details are omitted.

Figure 8:
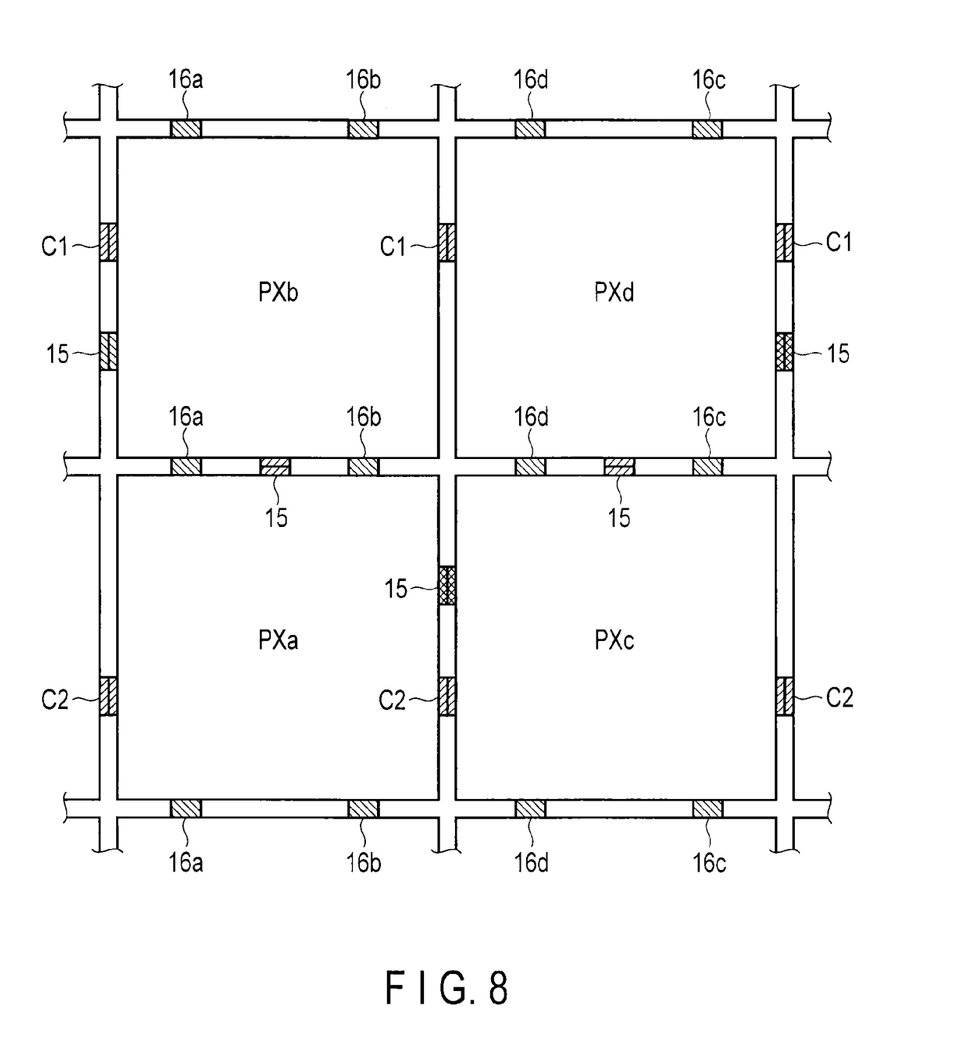
FIG. 8 is an interconnection layout of adjacent pixel areas of the reflection-type liquid crystal display device of the first embodiment.

FIG. 8 is an interconnection layout of adjacent pixel areas of the reflection-type liquid crystal display device of the first embodiment.

Figure 9:
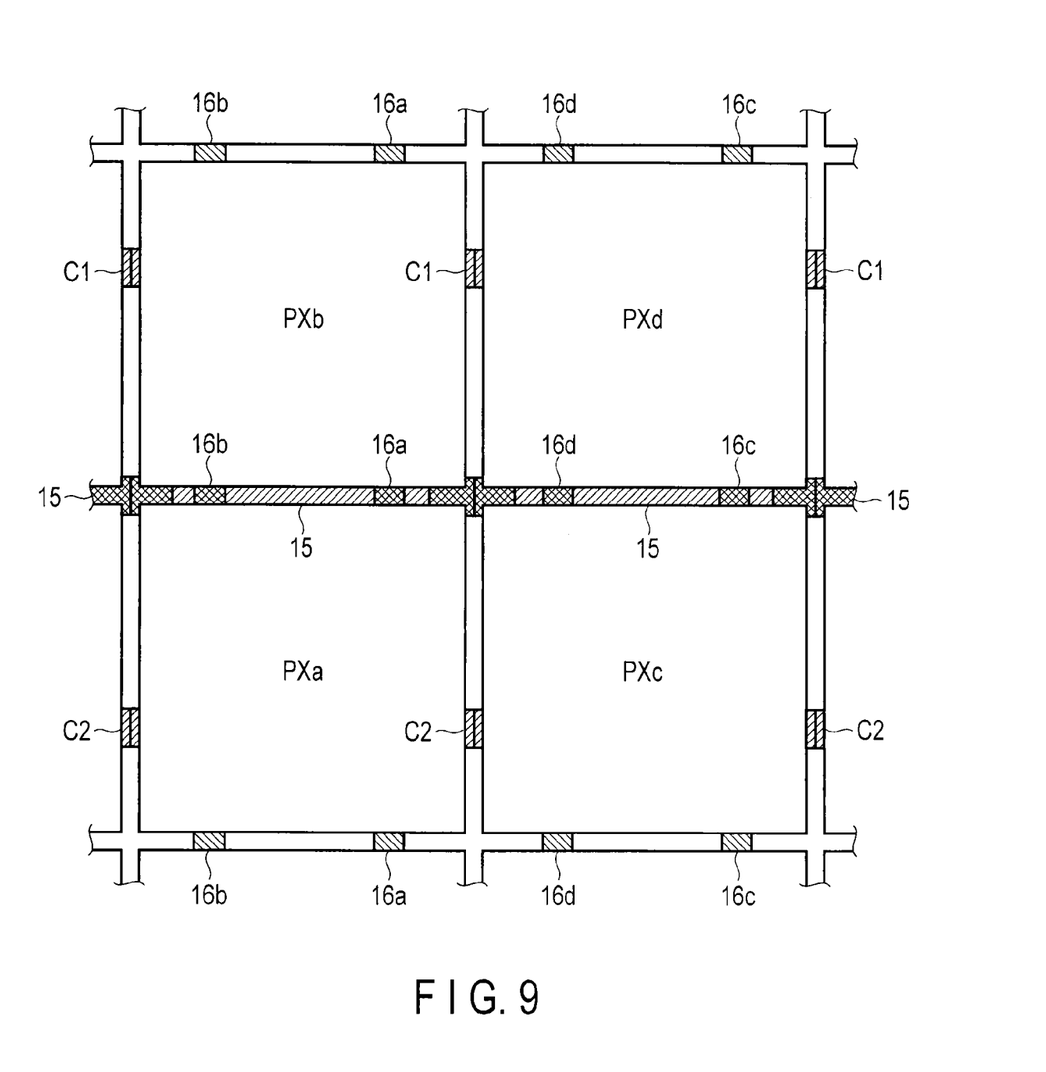
FIG. 9 is an interconnection layout of adjacent pixel areas of the conventional reflection-type liquid crystal display device.

FIG. 9 is an interconnection layout of adjacent pixel areas of the conventional reflection-type liquid crystal display device.

As shown in FIGS. 8 and 9, the lines (16a to 16d, C1, C2, and 15) are exposed from the gaps between the adjacent pixel areas. However, comparing FIG. 8 to FIG. 9, the area of the exposed lines is evidently less in the reflection-type liquid crystal display device of the first embodiment than the conventional reflection-type liquid crystal display device. Furthermore, the distribution of the exposed lines is evidently more regular within the square pixel in the reflection-type liquid crystal display device of the first embodiment than the conventional reflection-type liquid crystal display device.

Figure 10:
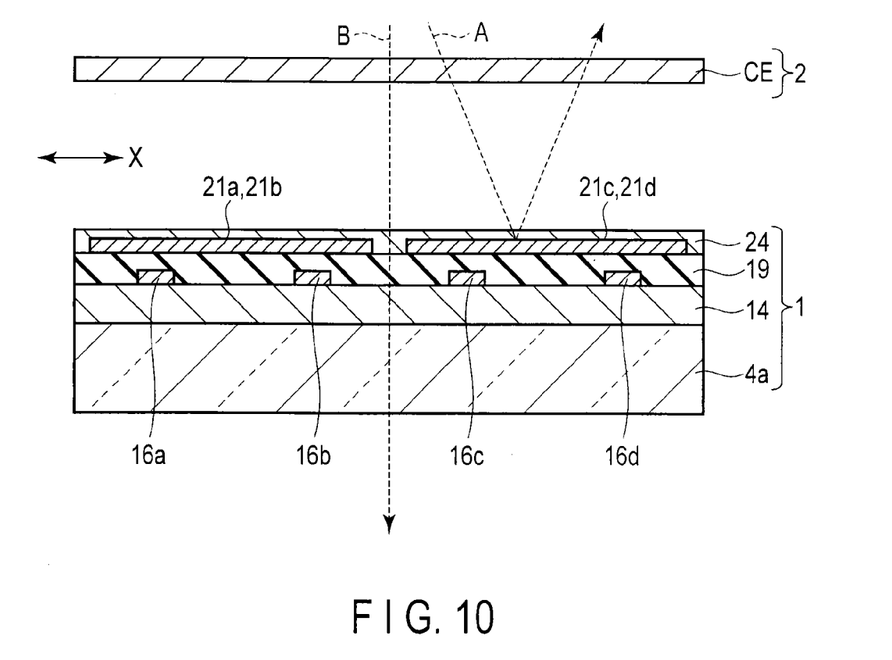
FIG. 10 is a view which illustrates an operation principle of the reflection-type liquid crystal display device of the first embodiment.

FIG. 10 is a view which illustrates an operation principle of the reflection-type liquid crystal display device of the first embodiment. FIG. 10 is a cross-sectional view taken along a row direction line in a square pixel, and specifically shows a layered structure of the array substrate 1 and a cross-section of the counter-substrate 2.

Underlying part 14 is formed on the glass substrate 4a of the array substrate 1. Although this is not shown, the underlying part 14 is composed of, for example, an undercoat film, TFT (semiconductor layer, gate insulating film, gate electrode, and the like), scanning line 15, and interlayer insulating film layered one after another. Signal lines 16a to 16d are formed on the underlying part 14. A flattening film 19 is formed on the underlying part 14 and signal lines 16. First pixel electrode 21a to fourth pixel electrode 21d are formed on the flattening film 19. An alignment film 23 is formed on the flattening film 19 and the pixel electrode 21. As a whole, the array substrate 1 is formed.

The transmissivity of the liquid crystal layer 3 changes depending on a voltage applied between the pixel electrode 21 and the counter-electrode CE. In the reflection-type liquid crystal display device, the pixel electrode 21 is formed of a light-reflecting metal or the like. As shown in FIG. 10, incident light along light path A coming from the counter-substrate 2 side is reflected from the pixel electrode 21. At that time, the tone of the reflection is controlled by the transmissivity of the liquid crystal layer 3. On the other hand, incident light along light path B coming from the counter-substrate 2 side passes through the gap between adjacent pixel electrodes and no reflection occurs.

As shown in FIGS. 8 and 9, the lines (16a to 16d, C1 to C2, and 15) are exposed from the gaps between the adjacent pixel areas. In the reflection-type liquid crystal display device, each line is formed of a metal. Thus, the light irradiated upon the lines is reflected as in the pixel electrode 21. However, these lines do not possess a desired voltage unlike the pixel electrode 21, and thus, light of a desired tone is not reflected. Thus, the lines to be exposed from the gaps between the adjacent pixel areas should preferably be as less as possible.

As mentioned above, the area of the exposed lines is less in the reflection-type liquid crystal display device of the first embodiment than the conventional reflection-type liquid crystal display device. Furthermore, the distribution of the exposed lines is more regular within the square pixel in the reflection-type liquid crystal display device of the first embodiment than the conventional reflection-type liquid crystal display device. Therefore, the reflection-type liquid crystal display device of the first embodiment has a high quality display performance.

[Second Embodiment]

In the second embodiment, a layout pattern of a scanning line 15 is different from that of the first embodiment. Structural elements which are the same as or similar to those of the first embodiment are referred to by the same reference numbers and their detailed descriptions are omitted.

Figure 11:
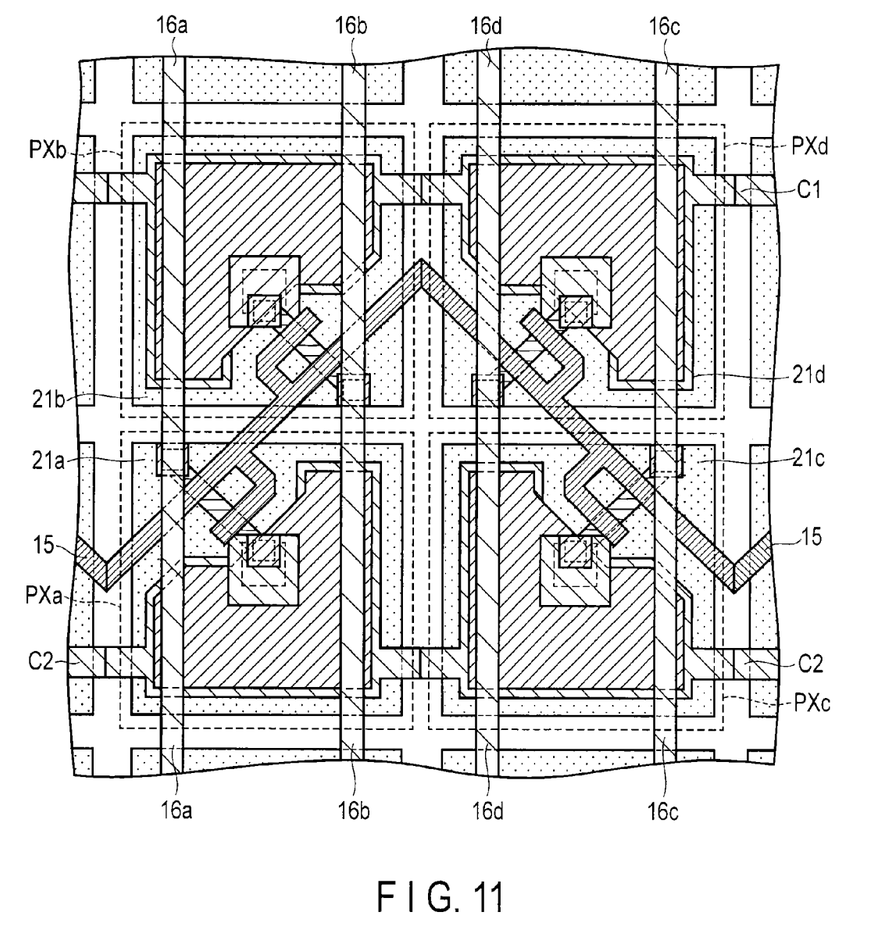
FIG. 11 is a view which shows a layout pattern of a square pixel on an array substrate of a reflection-type liquid crystal display device of second embodiment.

FIG. 11 is a view which shows a layout pattern of a square pixel on an array substrate of a reflection-type liquid crystal display device of the second embodiment.

In the layout pattern on the array substrate of the reflection-type liquid crystal display device of the second embodiment, the scanning line 15 is arranged to run through the whole pixel areas in each square pixel sequentially in such a manner that its entire width can be contained in each pixel area. This is similar to the first embodiment; however, more specifically, the scanning line 15 takes a mountain-like shape within the square pixel. That is, the scanning line 15 has a sawtooth shape which crosses the row direction X and the column direction Y within the square pixel.

Note that the above shape of the scanning line 15 within the square pixel may be changed to be symmetrical with respect to a boundary line between the first pixel PXa and the second pixel PXb.

With the second embodiment, the auxiliary capacitance Cs can be greater than that of the first embodiment.

Figure 12:
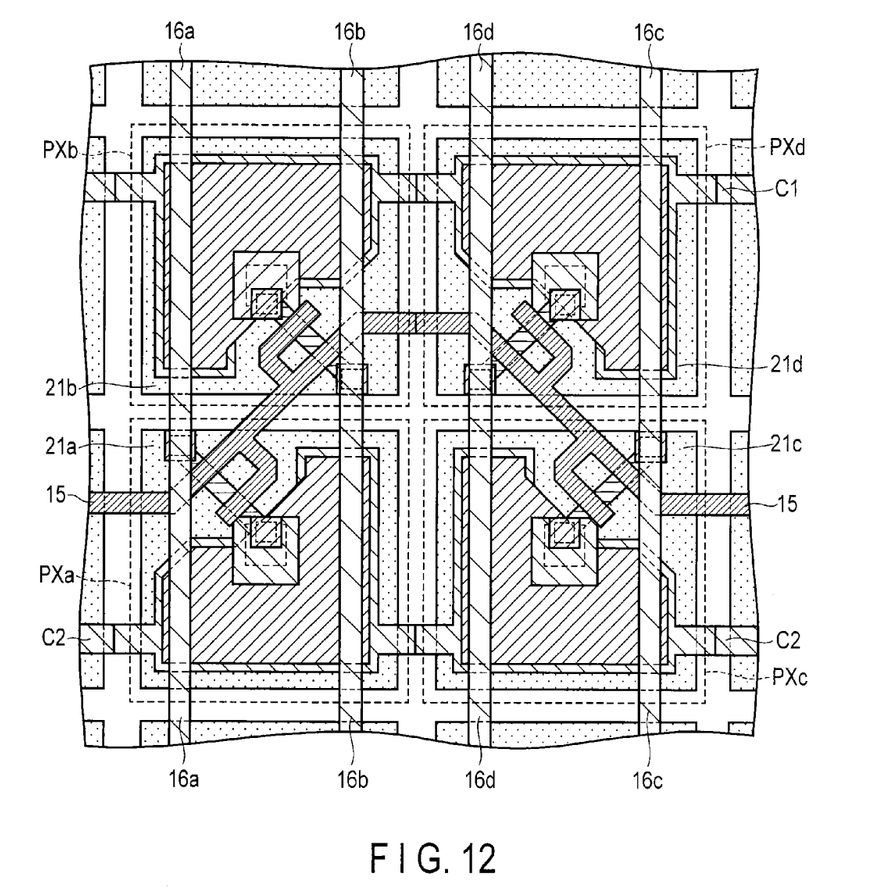
FIG. 12 is a view which shows a layout pattern of a square pixel on an array substrate of a variation of the reflection-type liquid crystal display device of the second embodiment.

FIG. 12 is a view which shows a layout pattern of a square pixel on an array substrate of a variation of the reflection-type liquid crystal display device of the second embodiment.

In the layout pattern on the array substrate of the reflection-type liquid crystal display device of this variation, the scanning line 15 takes a mountain-like shape within the square pixel as in the second embodiment; however, its top portion and valley portion are flattened. That is, the scanning line 15 has a sawtooth shape which crosses the row direction X and the column direction Y within the square pixel while the top and valley floor of the saw are drawn along the row direction X.

Note that the above shape of the scanning line 15 within the square pixel may be changed to be symmetrical with respect to a boundary line between the first pixel PXa and the second pixel PXb.

With this variation, the auxiliary capacitance Cs can be greater than that of the second embodiment.

Colors used in the square pixel, and the arrangement of color pixels in the square pixel are not limited to the examples described in the above embodiments.

Note that the square pixel structure including the scanning line 15 in either the first embodiment or the second embodiment may be adopted in a display device such that all of the square pixels in the display area AA have this structure or such that only a part of the square pixels in the display area AA have this structure.

Note that the terms used in the above embodiments include square pixel, unit pixel, and the like; however, no limitation is intended thereby. The embodiments are clearly applicable to other pixels than the square pixel.

According to the embodiments described above, provided are a high quality display device and reflection-type liquid crystal display device those are composed of unit pixels, which suppress the image quality deterioration due to scanning lines shared with pixels.

Based on the display device which has been described in the above-described embodiments, a person having ordinary skill in the art may achieve a display device with arbitral design changes; however, as long as they fall within the scope and spirit of the present invention, such a display device is encompassed by the scope of the present invention.

A skilled person would conceive various changes and modifications of the present invention within the scope of the technical concept of the invention, and naturally, such changes and modifications are encompassed by the scope of the present invention. For example, if a skilled person adds/deletes/alters a structural element or design to/from/in the above-described embodiments, or adds/deletes/alters a step to/from/in the above-described embodiment, as long as they fall within the scope and spirit of the present invention, such addition, deletion, and altercation are encompassed by the scope of the present invention.

Furthermore, regarding the present embodiments, any advantage and effect those will be obvious from the description of the specification or arbitrarily conceived by a skilled person are naturally considered achievable by the present invention.

Various inventions can be achieved by any suitable combination of a plurality of structural elements disclosed in the embodiments. For example, the some structural elements may be deleted from the whole structural elements indicated in the above-described embodiments. Furthermore, some structural elements of one embodiment may be combined with other structural elements of another embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
a unit pixel comprising a first pixel including a first pixel electrode, a second pixel adjacent to the first pixel in a column direction and including a second pixel electrode, a third pixel adjacent to the first pixel in a row direction and including a third pixel electrode, and a fourth pixel adjacent to the second pixel in the row direction and adjacent to the third pixel in the column direction and including a fourth pixel electrode;
a scanning line electrically connected to the first to fourth pixels; and
first to fourth signal lines extending in the column direction and disposed at intervals in the row direction, the first to fourth signal lines electrically connected to the first to fourth pixels, respectively, wherein
the first to fourth pixel electrodes are light reflective, the scanning line is sequentially drawn into each pixel area of the first to fourth pixels in a manner that an entire width of the scanning line is contained within each pixel area, and
the scanning line is drawn between the first sixel and the second pixel in the column direction, drawn between the second pixel and the fourth pixel in the row direction, and drawn between the fourth pixel and the third pixel in the column direction.

2. The display device according to claim 1, wherein the scanning line has a rectangular wave shape which is formed of a line along the row direction and the column direction within the unit pixel.

3. The display device according to claim 1, wherein the scanning line has a sawtooth shape which is formed of a line crossing the row direction and the column direction within the unit pixel.

4. The display device according to claim 1, wherein the scanning line has a sawtooth shape which is formed of a line crossing the row direction and the column direction in which a top portion and valley portion of the sawtooth shape are replaced with lines along the row direction within the unit pixel.

5. The display device according to claim 1, wherein the first to fourth pixels are configured to display different colors.

6. The display device according to claim 5, wherein the first to fourth pixels are a pixel configured to display red, a pixel configured to display green, a pixel configured to display blue, and a pixel configured to display white.

7. The display device according to claim 1, wherein the unit pixel is a square pixel.

8. A liquid crystal display device comprising:
a unit pixel comprising a first pixel including a first pixel electrode, a second pixel adjacent to the first pixel in a column direction and including a second pixel electrode, a third pixel adjacent to the first pixel in a row direction and including a third pixel electrode, and a fourth pixel adjacent to the second pixel in the row direction and adjacent to the third pixel in the column direction and including a fourth pixel electrode;
a scanning line electrically connected to the first to fourth pixels; and
first to fourth signal lines extending in the column direction and disposed at intervals in the row direction, the first to fourth signal lines electrically connected to the first to fourth pixels, respectively, wherein
the first to fourth pixel electrodes are light reflective, the scanning line is sequentially drawn into each pixel area of the first to fourth pixels in a manner that an entire width of the scanning line is contained within each pixel area, and
the scanning line is drawn between the first pixel and the second pixel in the column direction, drawn between the second pixel and the fourth pixel in the row direction, and drawn between the fourth pixel and the third pixel in the column direction.

9. A reflection-type liquid crystal display device comprising:
a pixel area in which unit pixels are arranged in a matrix, each unit pixel comprising a first pixel including a first pixel electrode, a second pixel adjacent to the first pixel in a column direction and including a second pixel electrode, a third pixel adjacent to the first pixel in a row direction and including a third pixel electrode, and a fourth pixel adjacent to the second pixel in the row direction and adjacent to the third pixel in the column direction and including a fourth pixel electrode;

an array substrate including the pixel area;

a counter-substrate opposed to the array substrate;

a scanning line electrically connected to the first to fourth pixels; and first to fourth signal lines extending in the column direction and disposed at intervals in the row direction, the first to fourth signal lines electrically connected to the first to fourth pixels, respectively, wherein the first to fourth pixel electrodes are light reflective, the scanning line is sequentially drawn into each pixel area of the first to fourth pixels in a manner that an entire width of the scanning line is contained within each pixel area, and the scanning line is drawn between the first pixel and the second pixel in the column direction, drawn between the second pixel and the fourth pixel in the row direction, and drawn between the fourth pixel and the third pixel in the column direction.

10. The reflection-type liquid crystal display device according to claim 9, wherein the scanning line has a rectangular wave shape which is formed of a line along the row direction and the column direction within the unit pixel.

11. The reflection-type liquid crystal display device according to claim 9, wherein the scanning line has a sawtooth shape which is formed of a line crossing the row direction and the column direction within the unit pixel.

12. The reflection-type liquid crystal display device according to claim 9, wherein the scanning line has a sawtooth shape which is formed of a line crossing the row direction and the column direction in which a top portion and valley portion of the sawtooth shape are replaced with lines along the row direction within the unit pixel.

13. The reflection-type liquid crystal display device according to claim 9, wherein the first to fourth pixels are configured to display different colors.

14. The reflection-type liquid crystal display device according to claim 13, wherein the first to fourth pixels are a pixel configured to display red, a pixel configured to display green, a pixel configured to display blue, and a pixel configured to display white.

15. The reflection-type liquid crystal display device according to claim 9, wherein the unit pixel is a square pixel.

16. The reflection-type liquid crystal display device according to claim 9, wherein the unit pixel is provided with a part of the pixel area.

\* \* \* \* \*